(12) United States Patent
Cannata (10) Patent No.: US 7,992,317 B1
(45) Date of Patent: Aug. 9, 2011

(54) TAPE MEASURE APPARATUS

(76) Inventor: Michael Scott Cannata, Sandwich, MA (US)

(*) Notice: Subject to any disclaimer, the term of this patent is extended or adjusted under 35 U.S.C. 154(b) by 178 days.

(21) Appl. No.: 12/356,551

(22) Filed: Jan. 21, 2009

Related U.S. Application Data

(60) Provisional application No. 61/011,637, filed on Jan. 18, 2008.

(51) Int. Cl.
*G01B 3/10* (2006.01)
(52) U.S. Cl. ............... 33/769; 33/760; 33/761
(58) Field of Classification Search ............ 33/755, 33/759, 760, 761, 768, 769, 770; D10/72
See application file for complete search history.

(56) References Cited

U.S. PATENT DOCUMENTS

| | | | |
|---|---|---|---|
| 79,965 A | 4/1868 | Fellows | |
| 2,914,269 A | 5/1955 | Freeman | |
| 3,672,597 A | 6/1972 | Williamson | |
| 3,838,520 A | 10/1974 | Quenot | |
| 4,766,673 A * | 8/1988 | Bolson | 33/760 |
| 4,786,010 A | 11/1988 | Dynan | |
| 5,000,484 A * | 3/1991 | Phelan et al. | 283/75 |
| 5,079,851 A | 1/1992 | Sill | |
| 5,230,159 A * | 7/1993 | Lipsey | 33/760 |
| 5,379,524 A | 1/1995 | Dawson | |
| 5,459,942 A * | 10/1995 | Hintz, Jr. | 33/768 |
| 5,691,923 A * | 11/1997 | Adler et al. | 702/164 |
| 5,845,413 A * | 12/1998 | Zayat, Jr. | 33/760 |
| 5,950,321 A * | 9/1999 | Pena et al. | 33/758 |
| 6,115,931 A * | 9/2000 | Arcand | 33/668 |
| 6,324,769 B1 | 12/2001 | Murray | |
| 6,658,755 B2 * | 12/2003 | Arlinsky | 33/760 |
| 6,718,649 B1 * | 4/2004 | Critelli et al. | 33/761 |
| 6,928,744 B2 * | 8/2005 | Schweighoffer et al. | 33/755 |
| 7,007,400 B2 | 3/2006 | Liao | |
| 7,234,119 B2 * | 6/2007 | Wu et al. | 715/864 |
| 7,363,723 B1 * | 4/2008 | Peterson | 33/760 |
| 7,549,235 B2 * | 6/2009 | Alders | 33/760 |
| 2004/0003947 A1 * | 1/2004 | Kesselman et al. | 177/25.13 |
| 2004/0068885 A1 * | 4/2004 | Rubin | 33/761 |
| 2007/0214674 A1 | 9/2007 | Erisoty | |
| 2008/0010847 A1 * | 1/2008 | Liao | 33/757 |

FOREIGN PATENT DOCUMENTS

| | | | |
|---|---|---|---|
| GB | 1534971 A | * | 12/1978 |
| GB | 2223983 A | * | 4/1990 |

OTHER PUBLICATIONS

Dynamitetoolco website, "Fastcap PMS-25 Metric/Standard Tape Measure", printed from website Jan. 21, 2009, 2 pages.

* cited by examiner

*Primary Examiner* — R. A. Smith (57) ABSTRACT

A tape measure apparatus that includes one or more information storage components and one or more protection components.

20 Claims, 7 Drawing Sheets

TAPE MEASURE APPARATUS

RELATED APPLICATIONS

This utility patent application claims priority to the provisional patent application titled "'TABLITAPE' 'TABLET TAPE' OR 'TABLITAPE'—a modified measure housing providing for writing or tablet area for retention of multiple dimensions fractions or drawings" (Ser. No. 61/011,637) that was filed on Jan. 18, 2008, the contents of which are hereby incorporated by reference in their entirety.

BACKGROUND OF THE INVENTION

The invention relates generally to measurement devices. More specifically, the invention is a tape measure device (the "tape measure apparatus" or simply the "apparatus") that provides for the storage and access of information.

The conventional tape measure is used in a virtually limitless of different contexts by a wide variety of different users, both professional and amateur. Carpenters, plumbers, construction workers, electricians, tailors, surveyors, technicians, and numerous other skilled and unskilled laborers make frequent use of some kind of tape measure. Tape measures are also often used by consumers in a domestic context, for a wide variety of handyman tasks and interior design activities.

Despite the proven utility and ubiquitous presence of tape measure devices, such devices do little to assist users after a measurement is taken. The capture of information such as a measurement is useless unless that measurement can be retained and accessed in the future. Furthermore, a particular measurement is without value if the association between the measurement and the dimension being measured is lost or forgotten. To be useful, a measurement must be precise (i.e. accurate) and it must be correctly associated with a particular dimensioning of a particular space, object, or collection of objects. Otherwise, a measurement that is not accurate or is a measurement that is incorrectly associated with a particular dimensioning is worthless at best and misleadingly harmful at worst. A false and incorrect sense of precision can cause a lot of harm before the error is discovered. In many respects, a conventional tape measure device invites all sorts of human error if the particular user is not well organized and exercising self discipline. This is especially true in an intense environment such as a busy construction site or shop floor.

There is a long-standing and yet unmet need in the prior art to facilitate the retention of measurement information so that such information can be accurately accessed in the future. The design of the modern conventional tape measure can be traced back to 1868 when U.S. Pat. No. 79,965 (the '965 patent) issued to Alvin J. Fellows. The '965 patent covered a tape measure that used a spring-click to hold the measuring tape in the desired position. The invention disclosed in the '965 patent made it easier for a user to capture accurate measurements by preventing the movement of the tape while it was being read. Prior to the design embodied in the '965 patent, the user of the tape measure device would have to hold the tape in place while reading the tape in order to prevent the tape from recoiling back into the tape.

The fundamental functionality of a convention tape measure remains remarkably unchanged from the design disclosed in the '965 patent. There have been numerous design improvements to be sure, but little change as to the how the tape measure devices function or as to how users utilize the tape measure devices. Although use of a tape measure often involves taking multiple measurements in a relatively short period of time, the vast majority of tape measures do not provide users with the ability to record those measurements for future reference. This is a significant deficiency as most people cannot remember multiple numbers over an extended period of time. Accurate recall of measurements can be particularly challenging when numbers involve fractions or complex dimensioning. In many contexts, dimensioning must be precise, and even relatively small errors or deviations can preclude satisfactory results and cause significant problems that can require substantial effort to be undone.

Some prior art tape measures designs do attempt to provide users with a limited ability to record measurement information by providing users with a writing surface on the housing of the tape measure. However, such designs have not been widely adopted because they inevitably suffer from one or more significant limitations. Some prior art designs require the use of a special writing utensil instead of a conventional pencil in order to successfully write on the tape measure. Some designs require the use of a special material such as sandpaper to effectively erase the writing surface. Other prior art designs may allow for use of a conventional writing utensil, but the writing is easily smudged rendering any written information unrecoverable by merely rubbing the writing surface accidentally with an article of clothing or a hand. Still other approaches result in a writing surface that is difficult to completely erase, substantially deterring use of the writing surface over the lifespan of the tape measure because of the "ghost" of the prior image remains to cloud future writings.

The prior art approaches to providing a writing surface attached to the housing of tape measure have not been widely accepted, adopted, and used because of significant disadvantages with those approaches. The limited commercial success of such approaches is evidence of material limitations in the prior art. The failure of the prior art to effectively enhance the ability of users to record and access measurement information is striking given the widespread use of tape measure devices.

Prior art tape measure devices without any mechanism for storing measurement information are far more numerous and enjoy substantially more commercial success than tape measure devices attempting to implement some type of information storage component. That is because prior art attempts to address the issue information storage suffer from flaws that render them undesirable in the minds of many users.

SUMMARY OF THE INVENTION

The invention relates generally to measurement devices. More specifically, the invention is a tape measure device (the "tape measure apparatus" or simply the "apparatus") that provides for the storage and access of information.

The apparatus can include or more information storage components. The apparatus can also include a protection component to prevent scratching or other damage to the information storage component.

The apparatus can be more fully understood upon reading the accompanying drawings that are discussed briefly below.

BRIEF DESCRIPTION OF THE DRAWING

The following drawings illustrate different examples and embodiments of the apparatus:

FIG. 1c is a side view block diagram illustrating an example of a tape measure apparatus where the protection component does not include a rim, but instead includes discrete protrusions and thus the face of the housing component is not totally blocked as in FIG. 1a.

The apparatus can be more fully understood upon reading the followin-g detailed description.

DETAILED DESCRIPTION

The invention relates generally to measurement devices. More specifically, the invention is a tape measure device (the "tape measure apparatus" or simply the "apparatus") that provides for the storage of information that can subsequently be accessed and/or retrieved.

I. Overview

The apparatus can include one or more information storage components on or more surfaces on the apparatus. Measurements, the applicable dimensions represented by the particular measurements, and other useful or related information can be captured, stored, and accessed in the future through use of the apparatus.

The apparatus provides a more desirable alternative than simply trying to remember measurements and related information. The apparatus also provides a more desirable and convenient alternative to carrying a separate device such as a notepad or tape recorder for the sole purpose of recording a measurement from a tape measure.

To protect the information storage component from being scratched or damaged by undesirable environmental interactions that are not uncommon in the working environment in which tape measures are used, the apparatus can include a protection component with one or more protrusions or even a rim or frame that surrounds the information storage component so that the information storage component does not come into contact with the ground if that side of the apparatus is placed face down. In many embodiments, the protection component is a rubber jacket the covers some or all of the housing component, with the rubber jacket including a rubber rim that carves out a protected area for the information storage component. The rubber can preclude the information storage component from contact with the ground or other potentially dangerous obstacles so long as those obstacles are at least as large as the apparatus and so long as those obstacles are substantially straight. In an embodiment with multiple information storage components, there can be a single rubber jacket with multiple rubber rims.

Many embodiments of the apparatus will include an erasable writing tablet as an information storage component. The user of such an apparatus can use a conventional graphite pencil to write on the erasable writing tablet. Such writings will not be easily smudged or otherwise rendered unreliable and vulnerable even though the writing is made with a conventional pencil due to the material composition and surface texture of the erasable writing tablet.

For embodiments providing users with the ability to write on the erasable writing tablet with a convention pencil, any markings can be erased by applying moderate pressure and rubbing the markings with a thumb or finger. The natural oils of the human hand can facilitate erasure that is complete and easy.

The apparatus can include multiple information storage components for the same apparatus. Some erasable writing tablets can be electronic writing tablets, such as a touch screen. Moreover, information storage components need not be touch or vision based. For example, a digital sound recorder and player can constitute an information storage component attached to and used with the apparatus.

The apparatus can integrate or more information storage components with tools such as central processing units (CPUs), memory storage components such as flash memory, networks and networking technologies such as wireless networks and Bluetooth connections to utilize apparatus information for a variety of processing performed both inside and outside the apparatus itself.

II. Definitions and Description of Elements

Figure 1A:
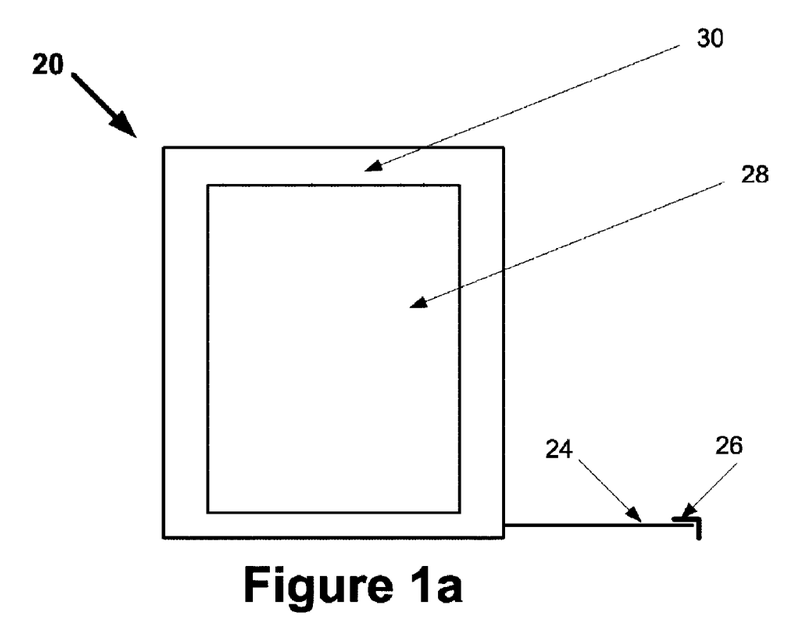
FIG. 1a is a side view block diagram illustrating an example of a tape measure apparatus that includes an erasable writing tablet as an information storage component. The illustration includes a rectangular shaped information storage component such as an erasable writing tablet framed by a rectangular shaped protection component, such as the rim of a rubber jacket protecting the apparatus.

FIG. 1a is a side view block diagram illustrating an example of a tape measure apparatus 20 that includes an erasable writing tablet as an information storage component 28. The apparatus 20 can be in the form of a wide variety of different shapes. FIG. 1a illustrates an embodiment of the apparatus 20 that is in the shape of a rectangular box, but other shapes are possible. The apparatus can be configured using virtually any shape used by prior art tape measures. Many embodiments of the apparatus 20 will involve six surfaces, with at least one surface being substantially flat to serve as a bottom face so that the apparatus 20 can be placed securely on the ground or some other substantially flat surface.

Most embodiments of the apparatus 20 involve lightweight devices that can easily be lifted, moved, tilted, rotated and otherwise oriented to different positions and environments. Thus, the identification of a particular surface of the apparatus 20 as a front surface (or face), rear surface (or rear), top surface (or top), bottom surface (or bottom), or one of two side surfaces (sides) is arbitrary, depending on the current orientation of the apparatus 20. For the sake of clarity with respect to the description below, the front surface of the apparatus 20 refers to the face or surface of the apparatus 20 from which the measuring tape 24 extends out of the bottom portion of the apparatus 20 and the rear surface of the apparatus 20 refers to the surface of the apparatus 20 opposite the front surface. For the sake of clarity with respect to the description below, the side faces are in plane perpendicular to the front and rear faces while being in planes parallel with each other. As discussed below, the information storage component 28 such as an erasable writing tablet is typically on the opposite side of the connection component such as a belt clip. For the sake of clarity with respect to the discussion below, the bottom and top surfaces are in a plane perpendicular to the side surfaces, while being in planes parallel with each other. The bottom surface is typically distinguishable from the top surface in that the measuring tape extends outward from the apparatus 20 closer to the bottom surface of the apparatus 20 than the top surface of the apparatus 20.

A. Measuring Tape

The apparatus 20 includes measuring tape 24 that is used to take measurements. The measuring tape 24 used in the apparatus 20 can be of varying widths and lengths depending on the embodiment and the intended use of the apparatus 20. For example, the measuring tape 24 could be a short as about 1 foot in length or have a length in excess of 100 feet, depending on the intended usage of the particular apparatus 20. Similarly, the measuring tape 24 will often have a width of about 1 inch, but the width of the measuring tape 24 in a particular embodiment will depend on the intended usage, the length, and the materials comprising the measuring tape can also vary depending on the anticipated usage. For example, in some embodiments, the measuring tape 24 may be as wide as 1¾% inches or even exceed 2 inches and be particularly rigid, while in other embodiments the measuring tape 24 could more narrow than ¾% or even ½ of an inch while being remarkably flexible. The apparatus 20 can be configured to utilize the full range and diversity of measuring tape 24 as taught in the prior art.

The measuring tape 24 can be comprised of a variety of different materials or combinations of materials. In some embodiments, a metallic measuring tape 24 is used to make the measuring tape 24 substantially rigid. In other embodiments, less rigid materials such as plastic or nylon can be used allowing the measuring tape 24 to be used to measure tight curves accurately.

Regardless of length, the measuring tape 24 has two ends. One end is fastened inside a housing component 22 and remains within the apparatus 20 at all times. The other end of the tape 24 can be released, extracted out of the housing component 22, and then retracted back into the housing component 22 using a variety of different technologies known in the prior art. In some embodiments, the end of the measuring tape 24 that is not fixed within the housing component 22 can be attached to a tab 26 that remains outside the housing component 22 even when the measuring tape 26 is fully retracted within the housing component 22. Users can pull on the tab 26 to extract out the measuring tape 24. The tab 26 can also serve to prevent the unfastened end of the measuring tape 24 from retracting deep into the housing component 22, which could impede future actions to pull out the tape 24 in order to perform a subsequent measurement.

In some embodiments of the apparatus 20, certain miniature magnetic or electronic components can be embedded directly onto the measuring tape 24 at various locations in order to facilitate automatic measurements through use of the apparatus 20 itself. Automated measurement technologies for reading the tape 24 can rely on the tape 24 itself, the internal mechanisms for extending/retracting the tape 24, or both. With the use of an automated measurement technology, the user need not actually read the tape 24 in the conventional way, although they are free to confirm the results of the automated measuring technology. An embodiment of the apparatus 20 that supports the automatic reading of measurements will likely include one or more electronic parts within the information storage component 28. Networking technologies and advanced processing algorithms can be used to build upon the data captured by the apparatus 20.

Figure 1B:
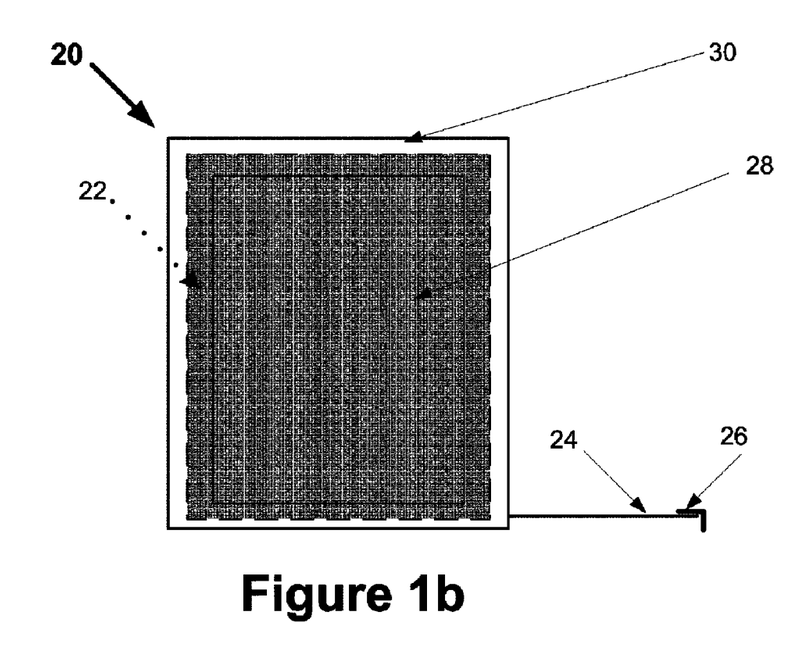
FIG. 1b is the side view block diagram of FIG. 1a that includes a hidden view of the housing component covered by the information storage component and the protection component. The tape measure and the mechanisms to facilitate the extraction and retraction of the tape measure are housed within the housing component.
Figure 1C:
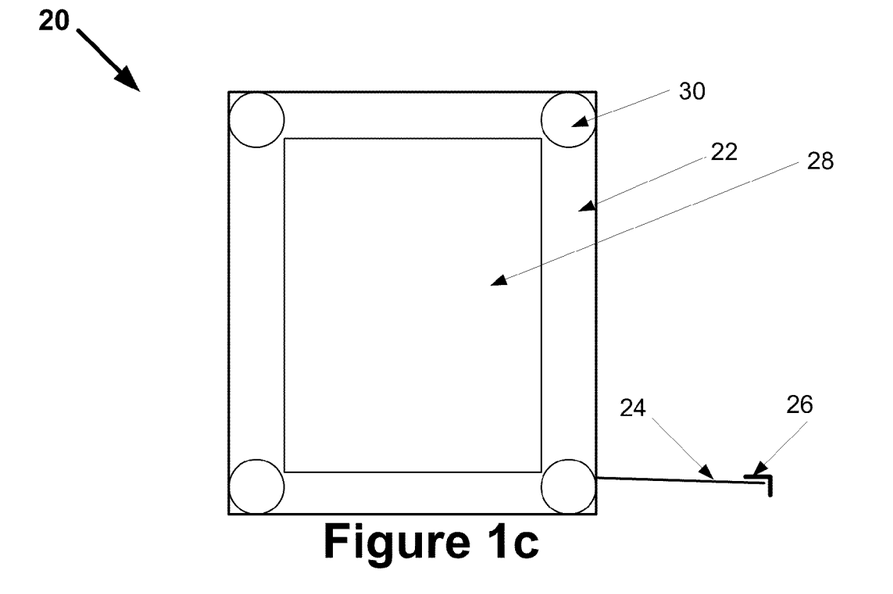

Measuring tape 24 is illustrated as being in at least a partially extended state in FIGS. 1a, 1b, and 1c. Only portions of the tape 24 that extend outside the surfaces of the apparatus 20 are illustrated in FIGS. 1a, 1b, and 1c. Different mechanisms to facilitate the release, extension, and retraction of measuring tape 24 with respect to apparatus 20 are well known in the art, and are not disclosed in the Figures. Such mechanisms are typically housed within the housing components 22 although instrumentation for locking the measuring tape 24 into place is typically located on the surface of the apparatus itself so that such instrumentation is accessible to the user.

It is possible for a single embodiment of the apparatus 20 to include more than one measuring tape 24 and more than one opening for measuring tape.

In some embodiments of the apparatus 20, the measuring tape 24 will be approximately 1 inch wide and be long enough to measure 25 feet.

B. Housing Component

A housing component 22 is comprised of the various connected surfaces that house the measuring tape 24 when the measuring tape 24 is within the apparatus 20. As discussed above, different technologies for facilitating the functionality of extending the measuring tape 24 from the apparatus 20, retracting the measuring tape 24 back to the inside of the apparatus 20, and otherwise manage the measuring tape 24 within the apparatus 20.

The housing component 22 and its various surfaces can be configured in a wide variety of different shapes and sizes, and can be constructed out of a wide range of different materials. In many embodiments, the design of the housing component 22 will be heavily influenced by decision decisions pertaining to the protection component 30 and in certain circumstances, the connection component 32.

The housing component 22 can be comprised of metal, fiberglass, plastic, wood, ceramic, rubber, and virtually any material that is rigid pr substantially rigid and capable of providing sufficient structural support to allow for the extraction and retraction of the measuring tape 24.

In the particular embodiment of the apparatus that is illustrated in FIG. 1a, the side face of the housing component 22 that would otherwise be visible, is hidden from view by the protection component 30 and the information storage component 28. Other embodiments of the apparatus 20, such as the illustration in FIG. 1c involve protection components 30 that are less comprehensive in their coverage over housing components 22 and thus the side face of the housing component 22 that is not covered by a protrusion of the protection component 22 or the information storage component 28 are visible in FIG. 1c. For embodiments in which the protection component 30 does cover provide comprehensive or substantially comprehensive coverage over the side surface of the housing component 22 (FIG. 1) or the rear surface of the housing component (FIG. 1b), the applicable surface of the housing component 22 is not visible. FIG. 1b illustrates the hidden surface of the side housing component 22 using a shaded surface illustration and a dotted arrow. FIG. 2b also illustrates the hidden surface of the rear housing component 22 using a shaded surface illustration and a dotted arrow.

In a typical embodiment of the apparatus 20, the only components of the apparatus 20 that are found outside the apparatus are the protection component 30, the information storage component 28, the connection component 32, and portions of the measurement tape 24 that are temporarily extracted outside the external surfaces of the apparatus 20.

Figure 2A:
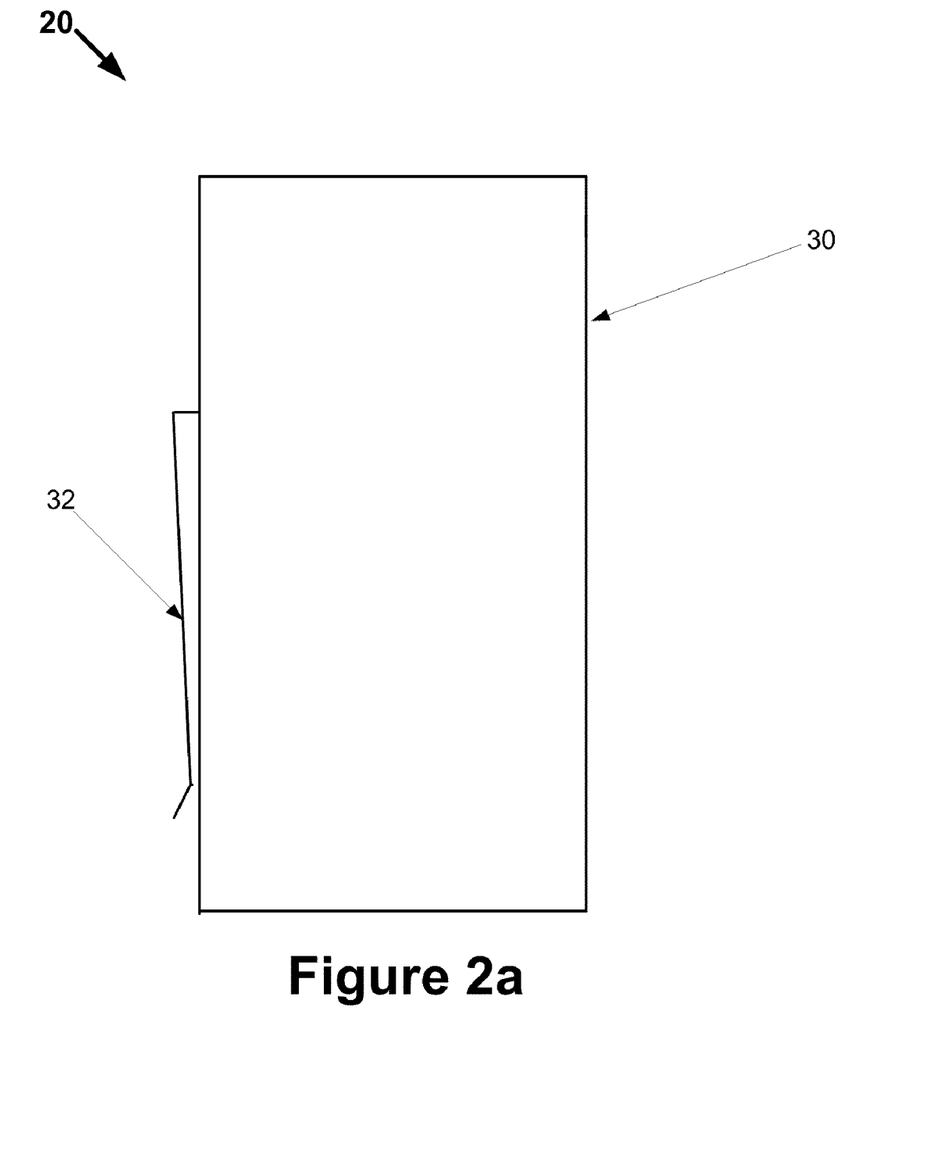
FIG. 2a is a rear view block diagram illustrating an example of a tape measure apparatus. A connection device is illustrated on one side of the apparatus, and a protection component that comprehensively engulfs the rear face of the housing component is the only other component that is visible in the illustration.
Figure 2B:
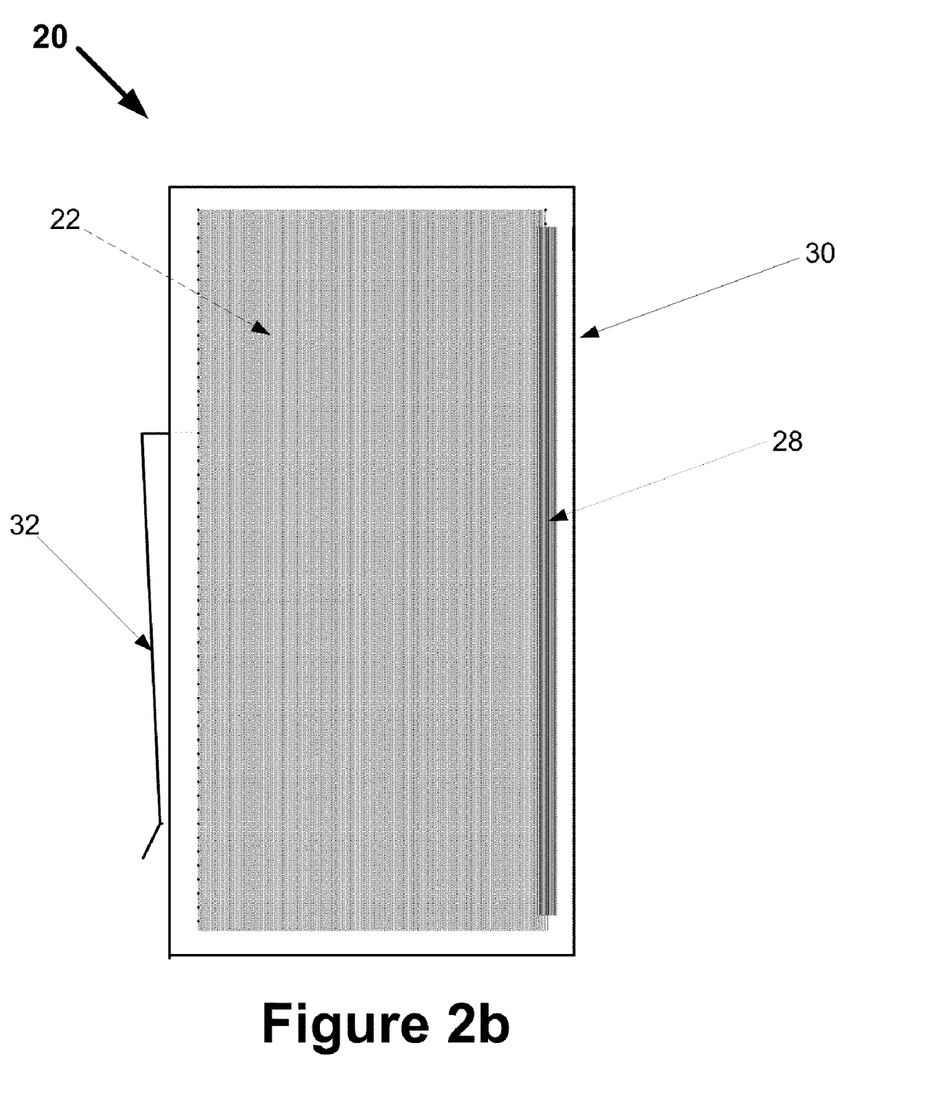
FIG. 2b is the rear view block diagram of FIG. 2a that includes a hidden view of the housing component and the information storage component covered by the protection component.

FIGS. 1b, 1c, and 2b each illustrate in full or in part, a view of a surface of the housing component 22. The housing component 22 is also displayed in FIGS. 2c and 2d, both of which are discussed below and illustrate an example of a cross-section view as to how the surfaces for the housing component 22, the protection component 30, and the information storage component 28 can be configured.

C. Protection Component

The apparatus 20 can be configured to include one or more protection components 30. In many embodiments of the apparatus 20, the protection component is a "jacket" placed over the external surfaces of the housing component 22. In some embodiments, the protection component 30 is made of rubber or other similar flexible substance. Although the protection component 30 can provide protection to the housing component 30, the measuring tape 24, and the extraction/retraction mechanisms within the housing component 30, the purpose of the protection component 30 is to protect the information storage component 28 from being scratch, cracked, or otherwise damaged.

Some embodiments of the protection component 30 will include a continuous rim for frame in the same or parallel plane as the information storage component 28, but extending further in an outward direction so that if the apparatus 20 is dropped on the side with the information storage component 28, the information storage component 28 will not be damaged. Other embodiments of the protection component 30 will utilize one or more protrusions strategically placed around the information storage component 28 in place of a rim. In either case, the protection component 30 is designed to serve as a potential base of support for the apparatus 20 so that the information storage component 28 is untouched and undamaged by anything in the surrounding environment.

FIGS. 1a and 1b illustrate a rim embodiment of the protection component 28. FIG. 1c illustrates a protrusion embodiment of the protection component 28.

Figure 2C:
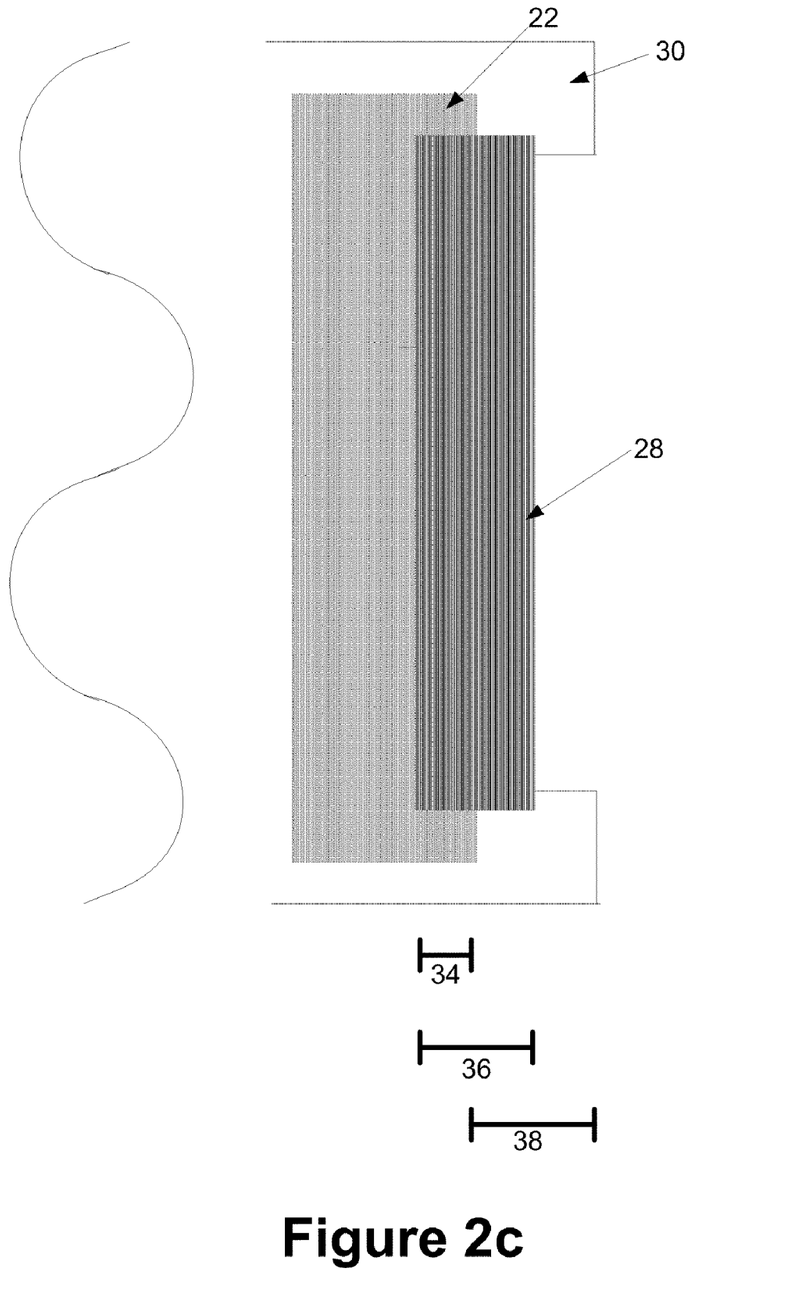
FIG. 2c is a blow-up diagram illustrating an example of cross-section view of an information storage component from the rear that is inset within a housing component surface.
Figure 2D:
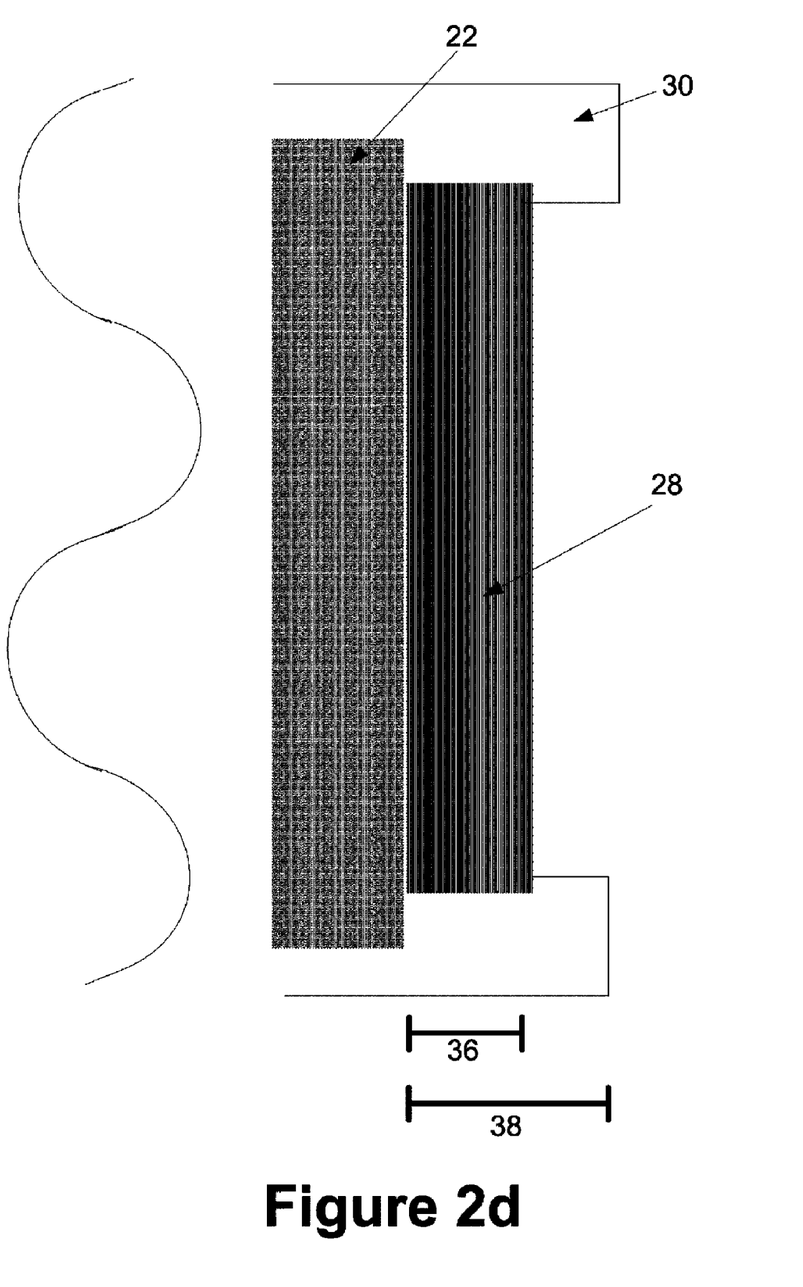
FIG. 2d is a blow-up diagram illustrating an example of a cross-section view of an information storage component from the rear that is not inset within a housing component surface.

The relative positioning of the surfaces of the housing component 22, the rim of the protection component 28, and the information storage component 28 is illustrated in FIGS. 2c and 2d and is discussed below.

Some embodiments of the protection component 30 are configured to be removable by human users. Other embodiments of the protection component are configured to be permanently fastened to the apparatus 20 through the use of adhesives, clasps, nails, screws, bolts, or any other suitable connection technology known in the prior art.

D. Connection Component

A connection component 32 is a component of the apparatus 20 that is temporarily or permanently connected to the apparatus 20 for the convenience of the user.

Some embodiments of the apparatus 20 will not include a connection component 32. Other embodiments will include at least one connection component 32. Still other embodiments may include more than connection component 32 and even more than one type of connection component 32. Examples of connection components include but are not limited to clips, belt clips, snaps, hooks, magnets, Velcro patches, straps, buttons, zippers, and virtually any other similarly suitable mechanism.

The use of a clip for a connection component 32 is illustrated in FIGS. 2a and 2b. The connection component 32 is often placed on a side face opposite of the information storage component 28.

E. Information Storage Component

The apparatus 20 can include one or more information storage components 28. Some information storage components 28 are manual (such as an erasable writing tablet), while others can be electronic (such as a touch screen connected to a central processing unit). Many information storage components are visually based (see above), but information storage components can also be non-visual, such as a digital sound recorder/player. Information storage components 28 can include but are not limited to erasable writing tablets, digital sound recorders/players, light emitting diode (LED) displays, touch screens, voice recognition applications, computer processors, and virtually any other information storage technology can be adapted for use in the relatively cramped quarters of a measuring tape apparatus 24.

A common embodiment of the apparatus 20 will include an erasable writing tablet. Such a tablet can be made up of a wide variety of materials, including but not limited to a metal, an anodized metal (such as anodized aluminum), plastic, acrylic, vinyl, formica, fiberglass, and other similarly behaving materials. In many embodiments, the material is selected so that a convention graphite pencil will make clear marks on the tablet not subject to smudging, while still allowing a human hand to apply pressure to the tablet to comprehensively and conveniently erase the tablet. The tablet should not smudge, or at least not smudge easily. However, pressure from a human hand (coupled with the natural oils of human skin) should fully erase the markings without leaving a trace or ghost of the erased image. Different embodiments of the apparatus 20 can be configured for different writing utensils made of different materials. Electronic tablets may require use of a stylus, while a touch screen or MP3 player would not require a utensil of any kind.

With respect to embodiments of the apparatus 20 utilizing an erasable writing tablet as an information storage component 28, the tablet can vary widely from embodiment to embodiment with respect to shape, height, width, thickness, and other properties. In many embodiments, the erasable writing tablet should have a shape that is similar to shape of the housing component 22 to which it is fastened because this will maximize the space available for the storage of information. Thus, a square tablet is often desirable with respect to a square shaped side surface for the housing component 22, a circular tablet is often desirable with respect to a circular shaped side surface, and so on and so forth. In some embodiments, the surface area of the tablet will be higher than 95% of the applicable surface area for that surface of the apparatus 20. Other embodiments may involve tablet surface area percentages between as low as 20% and as high as about 95%, and virtually any percentage in between.

Examples of writing tablets are illustrated in FIGS. 1a, 1b, and 1c. No writing tablet is outwardly visible in the rear view of FIG. 2a, but FIG. 2b reveals a writing tablet blocked from view by the comprehensive jacket of the protection component 30.

FIGS. 2c and 2d illustrate cross section views of configurations pertaining to information storage components 28. In some embodiments, information storage components 28 are only temporarily fastened to the applicable face of the housing component 22. In other embodiments, the information storage component 28 is permanently fixed and to the applicable face of the housing component 22. Multiple information storage components 28 can be fastened to the same housing face, but this is often inefficient. Multiple faces of the housing component 22 can each have their own information storage component 22. In some embodiments of the apparatus 20, all six surfaces of the housing component 22 (including even the front face) can each have their own information storage component 22.

In some embodiments (such as FIG. 2c), there is an inset 34 (i.e. cavity) within the housing component configured for placement of the information storage component 28. In other embodiments (such as FIG. 2d), there is no inset, and the information storage component 28 is simply fastened to the outer surface of the applicable housing component 22 face. The thickness (36) of the information storage component 28 and the thickness (38) of the rim or frame of the protection component 30 are illustrated in both the cross-sectional view of FIGS. 2c and 2d.

The cross section views illustrated in FIGS. 2c and 2d both illustrate the protective nature of the protection component 30. If illustrated designs both preclude the information storage component 28 from touching an external surface if that surface is substantially flat. In order to protect the information storage component, the protection component 30 such as a rim, frame, or protrusion should extend at least a couple of millimeters away from the apparatus 20 than the information storage component 28. In many embodiments, the distance in position will exceed at least ⅛ of an inch, while in still other embodiments greater differences ¼ of an inch, ⅓ of an inch, ½ of an inch, ⅔ of an inch, ¾ of an inch, 1 inch, or more, depending on the size of the apparatus 20 and the likely operating environment for the apparatus 20. Similarly the thickness 36 of the information storage component 28 can range from mere millimeters to more than half an inch, depending on the desired context of use. The thickness 38 of the protrusions or rim can vary from a few millimeters to more than ½ an inch, or even in excess of an inch in certain contexts.

FIG. 2b also illustrates the hidden surface of the rear housing component 22 using a shaded surface illustration and a dotted arrow. FIG. 1b illustrates the side face of the housing component 22 that is blocked by the protection component 30 and the information storage component 28.

The rear face of the housing component 22 is also hidden from view in FIG. 2a. FIGS. 1a and 2a each disclose an embodiment of the apparatus 20 that uses a protection component 30 that covers substantially all of the external surface of the apparatus 20 except for the information component 28.

Figure 3:
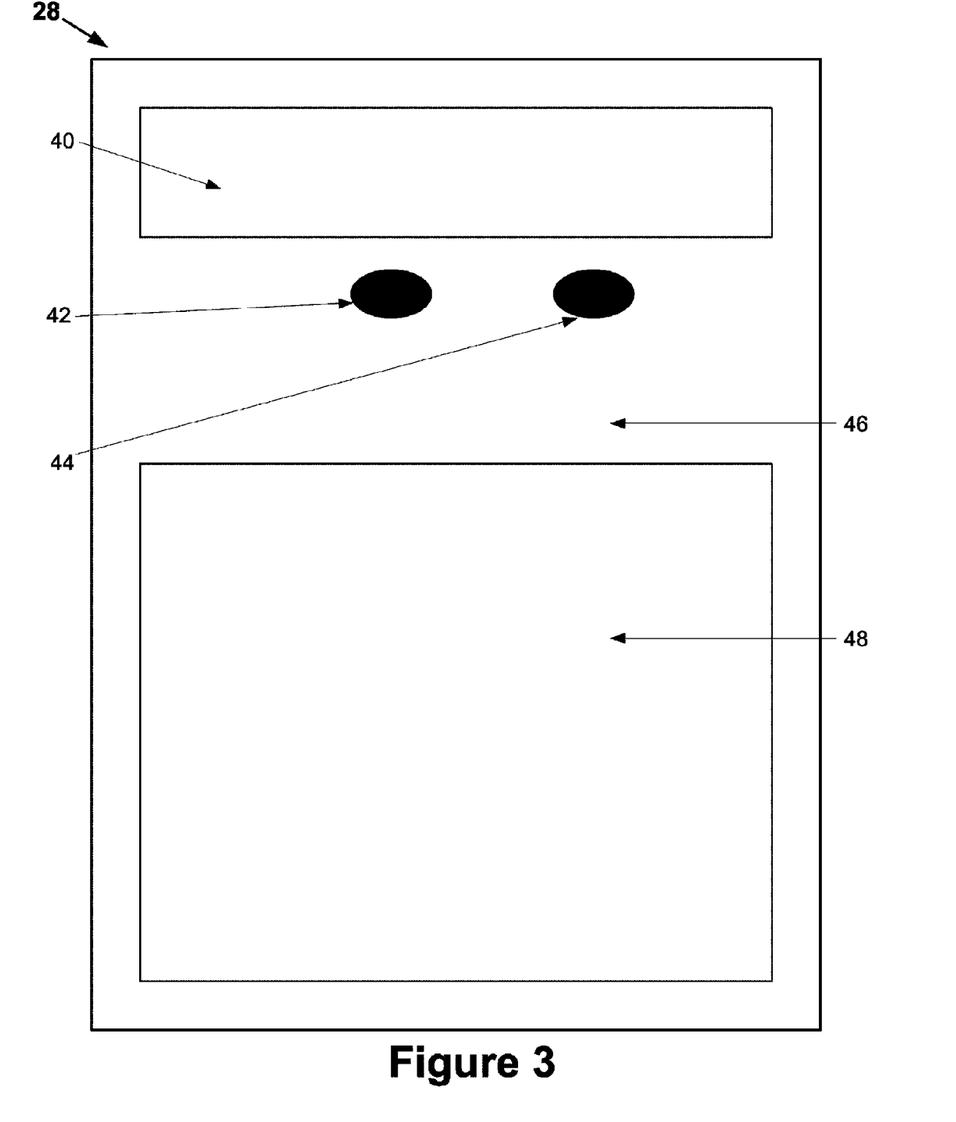
FIG. 3 is a block diagram illustrating an example of an information storage component that includes both electronic and electronic storage components, and both visual and non-visual storage components.

FIG. 3 illustrates an example of an information storage component 28 that highlights the vast number of different components 28 that can be used in conjunction with the apparatus 20. An LED display 40 can use to display previously stored information, automated measurement readings, and other useful information. Users of the apparatus 20 have the option of using a microphone 42 to record measurements which can then be played back through a speaker 44. The information display component 28 can include a touch-sensitive touch screen that can provide users with a wide variety of options, including virtual keyboards, menu selections, icons, and action buttons. Areas on the information storage component 28 that are not utilized by electronic storage components can constitute more traditional erasable writing tablet surfaces. Wireless technologies, including but not limited to blue tooth connections, can be used to automatically communicate information to and from the measuring tape apparatus 20.

III. Alternative Embodiments

In accordance with the provisions of the patent statutes, the principles and modes of operation of this invention have been explained and illustrated in preferred embodiments. However, it must be understood that this invention may be practiced otherwise than is specifically explained and illustrated without departing from its spirit or scope.

The invention claimed is:

1. A tape measure apparatus, comprising:
   a housing component including a plurality of external surfaces;
   a measuring tape, said measuring tape included an end portion fixed within said housing component;
   an information storage component fastened to at least one said external surface, wherein said information storage component includes an erasable writing tablet comprised of anodized metal; and
   a protection component, said protection component including a rim, wherein said protection component and said information storage component are fastened to said external surface, and wherein said rim extends further horizontally away from said apparatus than said erasable writing tablet.

2. The tape measure apparatus of claim 1, wherein said erasable writing tablet is adapted to visibly illustrate writings made with a conventional graphite pencil, wherein said rim is substantially continuously surrounding said erasable writing tablet, and wherein said erasable writing tablet is adapted to be erasable by the rubbing of a human hand.

3. The tape measure apparatus of claim 1, wherein said rim protrudes at least ⅛ inches outward from the surface of said erasable writing tablet, wherein said rim is removable, and wherein said erasable writing tablet is not comprised of vinyl.

4. The tape measure of claim 1, wherein said protection component and said rim are comprised of rubber and wherein said information storage component does not the touch the ground when the rim is placed on the ground.

5. The tape measure of claim 1, wherein said erasable writing tablet includes at least one of (a) plastic; (b) acrylic; (c) vinyl; and (d) fiberglass.

6. The tape measure of claim 1, wherein said erasable writing tablet is circular in shape.

7. The tape measure of claim 1, wherein said erasable writing tablet covers at least 70% of the surface area of said external surface of said housing component on which said erasable table is fixed.

8. The tape measure of claim 1, wherein said information display component includes a digital sound player/recorder and an electronic touch screen tablet in addition to said erasable writing tablet.

9. The tape measure of claim 1, wherein said erasable writing tablet is comprised of anodized aluminum, and wherein said connection component is a belt clip.

10. The tape measure of claim 1, wherein said erasable writing tablet does not require a customized writing instrument.

11. The tape measure of claim 1, wherein said erasable writing tablet is substantially circular in shape.

12. The tape measure of claim 1, wherein said rim is is part of a removable rubber jacket.

13. The tape measure of claim 1, wherein said information storage component includes an electronic touch screen tablet in addition to said erasable writing tablet, wherein said touch screen tablet is configured to store information on a memory unit located on said apparatus and to transmit information using a Bluetooth connection, wherein said information display unit further comprises an MP3 player/recorder and wherein said touch screen tablet is an LED screen, further comprising an automated sensor fastened within said housing component to automatically capture measurements from said retractable measurement tape.

14. The tape measure of claim 1, wherein said information storage component comprises an erasable writing tablet, wherein said said erasable writing tablet covers more than 50% of at least one said external surface, and wherein said rim protrudes further outward then said erasable writing tablet.

15. A tape measure apparatus, comprising:
a housing component, said housing component including a plurality of external surfaces, said plurality of surfaces including a front surface, a first side surface, and a second side surface;
a connecting component fastened to said first side surface, wherein said connecting component comprises at least one of: (a) a clip; (b) a snap; (c) a magnet; (d) a hook; (e) a patch; (f) a strap; and (g) a button;
a retractable measuring tape, wherein said retractable measuring tape provides for being extended through an opening in said front surface, wherein said retractable measuring tape includes a first end and a second end, wherein said first end is fixed within said housing component and cannot be extended outside said housing component, wherein said second end is attached to a tab located outside said housing component even when said retractable measuring tape is fully retracted;
an erasable writing tablet, wherein said erasable writing tablet is fastened to said second side surface with an adhesive, wherein said erasable writing tablet provides for visibly illustrating written notations from a conventional pencil, wherein said erasable writing tablet provides for the total erasure of marks left by a conventional pencil through the rubbing by a human hand, wherein at least 60% of said second side surface is covered by writing accessible portions of said erasable writing tablet, wherein said erasable writing tablet is comprised of anodized metal; and
a protection component comprising a protrusion, wherein said protection component is fastened to the exterior of said housing component and to the exterior of said erasable writing tablet, wherein at least a portion of said erasable writing tablet is between said housing component and said protection component, wherein said protrusion has an outward extension distance of at least 1/8 inches.

16. The apparatus of claim 15, wherein said housing component is comprised of plastic, wherein said erasable writing tablet is not an electrical device requiring power, wherein said retractable measuring tape includes a steel material, wherein said housing component includes a bottom surface that is substantially flat, and wherein said protection component is comprised of a rubber jacket.

17. The apparatus of claim 15, wherein said protection component is comprised of a rubber and said protrusion is a rubber rim surrounding the borders of said erasable writing tablet on said second side surface, wherein said rubber rim provides for supporting said apparatus when the second side surface is placed parallel and closest to the ground when the ground is substantially flat, and wherein said housing component is substantially cylindrical in shape.

18. The apparatus of claim 15, wherein said erasable writing tablet is configured to display illustrations from a pencil, wherein said erasable writing tablet is substantially in the shape of a circular disk, and wherein said erasable writing tablet is configured to be permanently attached to said second side surface.

19. The apparatus of claim 15, wherein said apparatus comprises a plurality of erasable writing tablets, further comprising a plurality of erasable writing tablets, wherein said housing component further comprises a top surface, said plurality of erasable writing tablets include a supplemental writing tablet fastened to said top surface.

20. A tape measure apparatus, comprising:
a housing component, said housing component including a plurality of external surfaces, said plurality of surfaces including a front surface, a first side surface, and a second side surface, wherein said housing component is comprised of a plastic;
a clip attached to said first side surface, wherein said first side surface is substantially flat;
a retractable measuring tape, wherein said retractable measuring tape provides for being extended through an opening in said front surface, wherein said retractable measuring tape includes a first end and a second end, wherein said first end is fixed within said housing component and cannot be extended outside said housing component, wherein said second end is attached to a tab which resides outside and adjacent to said housing component when said measuring tape is fully retracted, wherein said retractable measuring tape is comprised of a steel, wherein said retractable measuring tape is approximately 1 inch wide and long enough for said apparatus to measure approximately 25 feet;
an erasable writing tablet, wherein said erasable writing tablet is fastened to said second side surface with an adhesive, wherein said erasable writing tablet is comprised of anodized aluminum, wherein said erasable writing tablet is in the shape of circular disk having a diameter between approximately 2 and 3 inches, wherein said erasable writing tablet provides for written notations from a conventional pencil, wherein said erasable writing tablet provides for the total erasure of marks left by a conventional pencil through the rubbing by a human hand, wherein at least 75% of said second side surface is covered by writing accessible portions of said erasable writing tablet; and
a rubber jacket comprising a rubber rim, wherein said rubber jacket is permanently fastened to the exterior of said housing component and to the exterior of said writing tablet, wherein at least a portion of said erasable writing tablet is between said housing component and said rubber jacket, wherein said rubber rim has an outward extension distance of at least 1/8 inches.

* * * * *